(12) United States Patent
Hwang et al.

(10) Patent No.: US 6,995,716 B2
(45) Date of Patent: Feb. 7, 2006

(54) SELECTIVELY ENGAGED ANTENNA MATCHING FOR A MOBILE TERMINAL

(75) Inventors: Huan-Sheng Hwang, Cary, NC (US); Scott LaDell Vance, Cary, NC (US); Gerard James Hayes, Wake Forest, NC (US); Bruce Emerson Wilcox, Cary, NC (US)

(73) Assignee: Sony Ericsson Mobile Communications AB, (SE)

( * ) Notice: Subject to any disclaimer, the term of this patent is extended or adjusted under 35 U.S.C. 154(b) by 0 days.

(21) Appl. No.: 10/709,379

(22) Filed: Apr. 30, 2004

(65) Prior Publication Data

US 2005/0243000 A1      Nov. 3, 2005

(51) Int. Cl.
*H01Q 1/24* (2006.01)
*H04M 1/00* (2006.01)

(52) U.S. Cl. .................. 343/702; 455/90.3; 455/550.1; 455/575.1; 455/575.3; 455/575.4; 455/575.7

(58) Field of Classification Search ............... 343/702; 455/90.3, 550.1, 575.1, 575.3, 575.4, 575.7
See application file for complete search history.

(56) References Cited

U.S. PATENT DOCUMENTS

| | | | |
|---|---|---|---|
| 5,374,937 A * | 12/1994 | Tsunekawa et al. | 343/702 |
| 5,635,943 A | 6/1997 | Grunwell | 343/702 |
| 5,686,927 A | 11/1997 | Simmons | 343/702 |
| 5,717,408 A | 2/1998 | Sullivan et al. | 343/702 |
| 5,923,297 A * | 7/1999 | Kim et al. | 343/702 |
| 6,002,372 A | 12/1999 | Sullivan | 343/702 |
| 6,624,795 B2 * | 9/2003 | Boyle | 343/895 |
| 2003/0096583 A1 * | 5/2003 | Watanabe | 455/90 |
| 2003/0216150 A1 * | 11/2003 | Ueda | 455/552.1 |
| 2004/0242289 A1 * | 12/2004 | Jellicoe et al. | 455/575.1 |

FOREIGN PATENT DOCUMENTS

| EP | 0 518 526 | * 12/1992 |
|---|---|---|
| EP | 1296407 | 3/2003 |

(Continued)

OTHER PUBLICATIONS

Patent Abstracts of Japan,NEC Shizuoka Ltd., vol. 2002, No. 4, Aug. 4, 2002 and Dec. 14, 2001.

(Continued)

*Primary Examiner*—Wilson Lee
*Assistant Examiner*—Leith Al-Nazer
(74) *Attorney, Agent, or Firm*—Moore & Van Allen PLLC; Steven B. Phillips

(57) ABSTRACT

Selectively engaged antenna matching for a mobile terminal. Antenna matching can be engaged, disengaged, or switched as needed depending on whether a movable cover or clamshell portion of a mobile terminal is open or closed. A switch can connect a single matching network to a radiating element in one case, and disconnect the single matching network from the radiating element in the other case. Alternatively, the switch can connect one matching network to the radiating element to achieve one matched condition, and the other matching network to the radiating element to achieve the other matched condition. In other embodiments, a switchable matching arrangement can alter the signal and/or ground feed points of an antenna. The technique can be applied to planar, fixed external, or collapsible antennas.

24 Claims, 9 Drawing Sheets

FOREIGN PATENT DOCUMENTS

| | | |
|---|---|---|
| EP | 0518526 | 12/2003 |
| GB | 2 389 463 | * 12/2003 |
| GB | 2389463 | 12/2003 |
| WO | WO 96/37967 | * 11/1996 |
| WO | WO01/29927 | 4/2001 |

OTHER PUBLICATIONS

Patent Abstracts of Japan, Yaesu Musen Co, Ltd.., vol. 1996, No. 10, Oct. 31, 1998 and Jun. 11, 1998.

Sony Ericsson Mobile Communications AB, International Application No., PCT/US04/036211, Written Opinion, Jan. 31, 2005.

Sony Ericsson Mobile Communications AB, International Application No., PCT/US04/036211, International Search Report, Jan. 31, 2005.

* cited by examiner

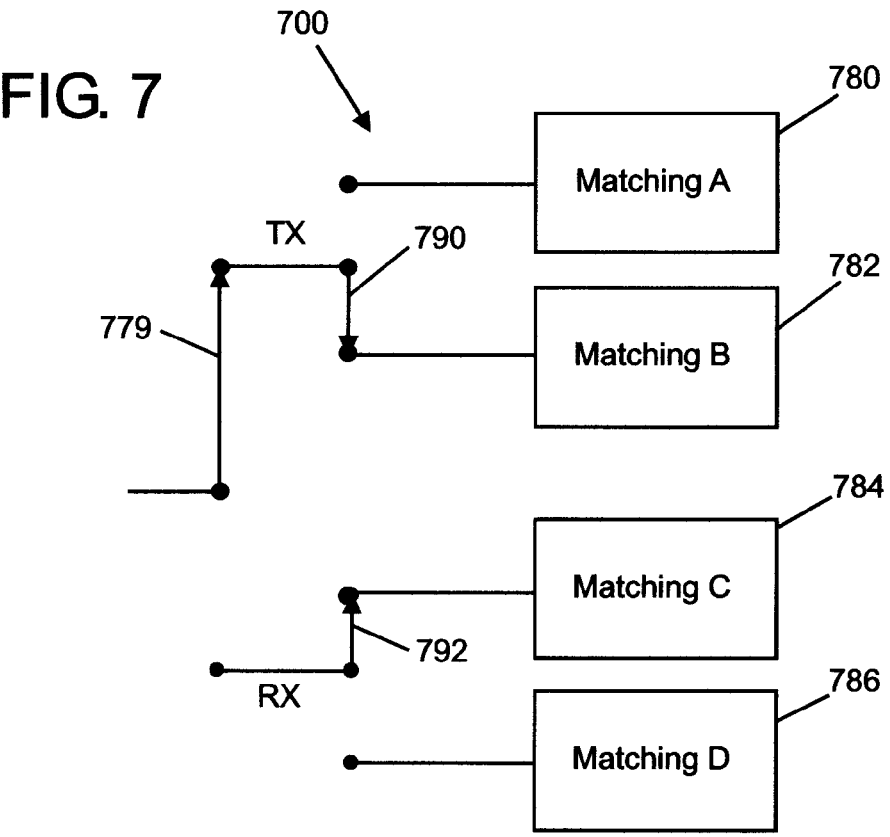
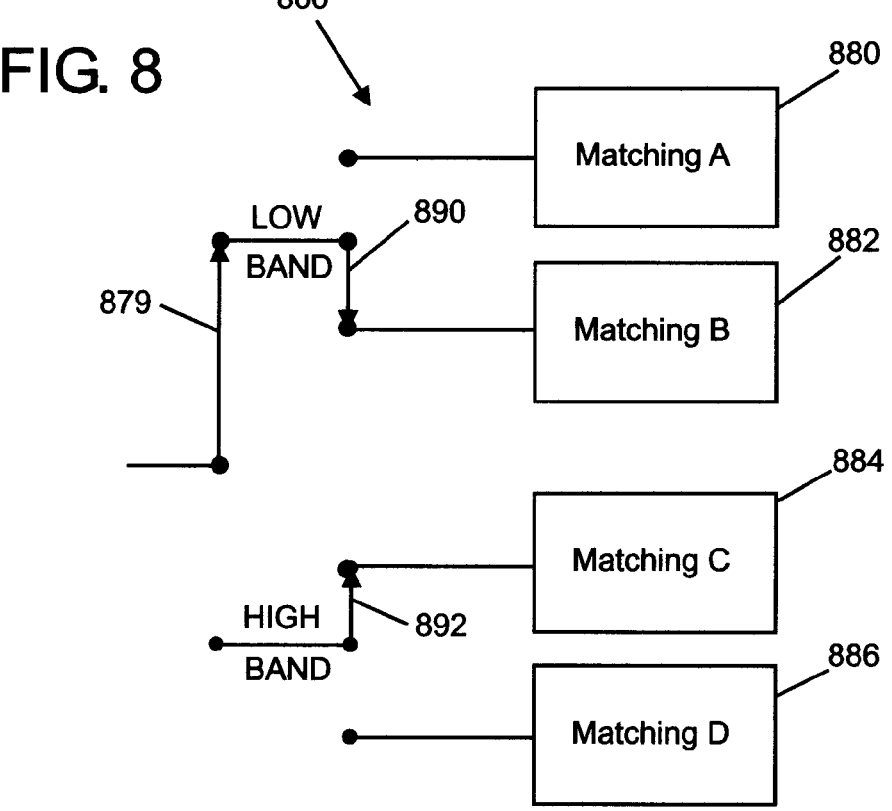

SELECTIVELY ENGAGED ANTENNA MATCHING FOR A MOBILE TERMINAL

BACKGROUND OF INVENTION

Cellular or wireless phones of the "clamshell" and "flip" type have become increasingly popular in recent years. Such designs can present unique challenges in the area of antenna design. Depending on the nature of the "flip" cover and the particular antenna configuration being used, the position of the flip cover can have a significant impact on the performance and matching characteristics of an antenna system. For example, the electrical ground plane presented by the chassis of the mobile terminal can nearly double when a flip cover is moved from the closed position to an open position. Electrical connections through the hinge may increase coupling to the antenna when the flip cover is open. An antenna system and its interface can be optimized for one configuration. However, changing to the other configuration can often be seen as a degradation of the voltage standing wave ration (VSWR) of the antenna. Such degradation results in poor performance and may in fact be unacceptable for some multiband antenna systems.

In some cases, designers make an assumption that one position is the most important, for example the open position in which most people operate a phone for voice communication. Thus, an antenna system is matched to perform best with a clamshell or flip cover phone in that position. Unfortunately, the same matching circuit and/or feed system can result in significantly degraded performance in the other operating position. FIG. 1 illustrates this situation. FIG. 1 is divided into FIGS. 1A and 1B for clarity. FIG. 1 shows a VSWR curve, 100, of an example mobile terminal with a two-band antenna. The VSWR is plotted on vertical axis 102, and frequency is plotted on horizontal axis 104. The mobile terminal in question operates on frequency band A and frequency band B, both marked on horizontal axis 104. Performance considerations in this example dictate a VSWR of less than 2.5 to 1 be maintained for the frequency ranges of interest. As can be readily seen, VSWR curve 100 has minimum VSWR points 106 and 108 occurring near the center of frequency bands A and B. As can also be seen, the VSWR remains substantially below the 2.5 to 1 goal over the entire operating range of frequency bands A and B, as indicated by portions of the VSWR curve being below line 110 in the graph of FIG. 1A. FIG. 1A illustrates VSWR for a mobile terminal with its flip cover in one position.

FIG. 1B illustrates VSWR curve 120 plotted on the same axis as illustrated in FIG. 1A, as evidenced by like reference numbers. FIG. 1B illustrates a VSWR graph for the same mobile terminal with its flip cover in the other position. The minimum VSWR achieved in band A is approximately 6.1 to 1, as shown at point 122. The minimum VSWR achieved in frequency band B is just over 2.5:1, as illustrated by point 124. In this example, antenna performance degrades significantly when the flip cover of the mobile terminal is moved to the other position.

SUMMARY OF INVENTION

The present invention, as disclosed in example embodiments, provides for multiple, switchable antenna matching arrangements that can be engaged or disengaged as needed depending on whether a movable cover or clamshell portion of a mobile terminal is open or closed. Thus, consistent antenna performance characteristics are achieved with a mobile telephone device in either an open position or a closed position. The result is a more versatile device. For example, good performance and reception quality can be achieved whether a user is engaging in a conversation with an open phone held to his or her face, or a conversation with an closed phone in a "speaker phone," "push-to-talk (PTT)," or "hands-free" mode. Embodiments of the invention can be adapted to various styles of phones and various types of antennas. The movable cover can be a flip cover, clamshell type, rotatable cover, sliding cover, or any other type of cover with at least two positions or states.

In some embodiments, an antenna system for a mobile terminal with a movable cover includes a radio frequency (RF) interface to connect the antenna system to the mobile terminal and an antenna consisting of at least one radiating element. A switchable matching arrangement is disposed between the RF Interface and the radiating element. The RF interface can include electrical signal contacts and/or electrical ground contacts. The switchable matching arrangement is operable to switch the antenna system into a first matched condition when the movable cover is in a first position and into a second matched condition when the movable cover is in a second position. In example embodiments, one position is an open position and the other position is a closed position. The switchable matching arrangement can consist of a single matching network and a switch which responds to the position of a movable cover to connect the single matching network to the radiating element in one case, and disconnect the single matching network from the radiating element in the other case in order to feed the radiating element directly. Alternatively, the switchable matching arrangement can consist of two matching networks, where the switch responsive to the position of the movable cover connects one matching network to the radiating element to achieve one matched condition, and the other matching network to the radiating element to achieve the other matched condition.

In other embodiments, the switchable matching arrangement of the antenna system can include two different feed points for the radiating element. In such an embodiment, a switch responsive to the position of a movable cover connects the RF interface at one of the feed points to achieve one matched condition, and at the other feed point to achieve another matched condition. A change in the way the antenna system is fed can also be engaged with an antenna which uses an RF connection between the RF interface and the radiating element, and a separate ground connection. For example, the ground connection can be made switchable, such that the position of the movable cover dictates whether the ground connection is made or not. Such an embodiment can be employed, for example, with planar or semi-planar inverted-F antennas.

An antenna system according to embodiments of the present invention can be employed in any mobile terminal including a movable cover, regardless of whether the movable cover is active or passive, or whether it is of the "clamshell," "flip," or "sliding" type. Such a mobile terminal includes transceiver components operable to transmit and receive communication signals, and can include a processing platform which controls the operation of the transceiver components and also determines the position of the movable cover. In such a mobile terminal, the antenna system is switched into a first matching condition when the movable cover is in one position, and then switched into a second matching condition when the movable cover is in another position. Thus, a user can engage in telecommunication signaling through the antenna system in either condition, and maintain good antenna performance. Embodiments of the invention can even be applied in mobile terminals with a radiating element that can be extended and collapsed. In such a case, the first matched condition and the second matched condition are typically achieved when the radiating element is in one position, for example extended. The switchable matching arrangement can further include third and fourth matched conditions to cover both positions of a movable cover when the radiating element is in another position, for example, collapsed. Similarly, first, second, third, and fourth matching arrangements can be applied to selectively match an antenna for each cover position in both transmit and receive mode, and/or for different radio frequency bands. Such a switchable matching arrangement can be achieved in any of the ways previously mentioned, either with varying feed arrangements or with matching networks.

BRIEF DESCRIPTION OF DRAWINGS

FIG. 1 is divided into FIGS. 1A and 1B for clarity.

FIG. 2 is divided into FIGS. 2A and 2B for clarity.

FIG. 3 is again divided into FIGS. 3A and 3B.

FIG. 4 is divided into FIGS. 4A and 4B.

FIG. 5 is broken into FIGS. 5A and 5B for clarity.

FIG. 7 is a schematic illustration of another embodiment of an antenna system according to the invention that provides additional matching selection for transmit and receive conditions.

FIG. 8 is a schematic illustration of another embodiment of an antenna system according to the invention that provides matching selection for different bands.

FIG. 10 is a combination figure illustrating various embodiments using dotted lines for some of the elements.

DETAILED DESCRIPTION

Figure 1A:
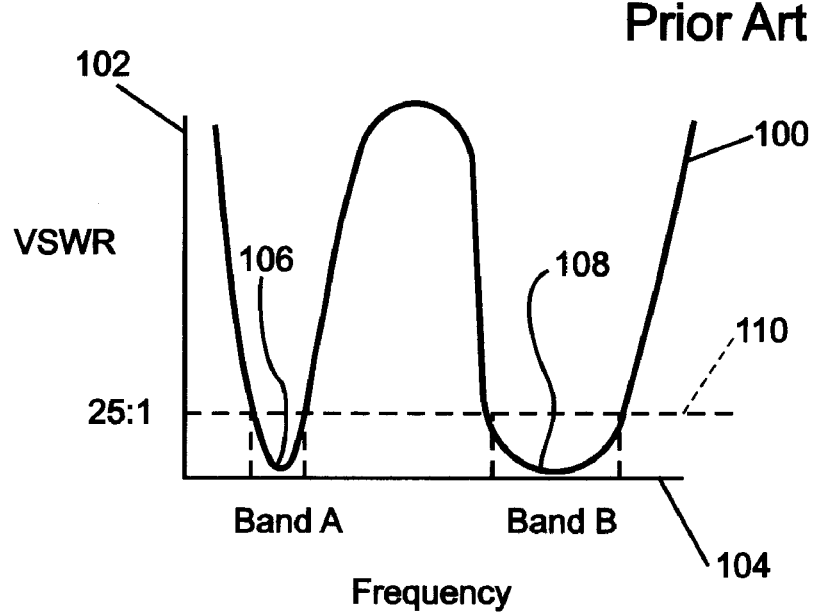
FIG. 1 illustrates two VSWR charts which describe the problem of poor antenna matching when a flip type mobile terminal is in one position.
Figure 1B:
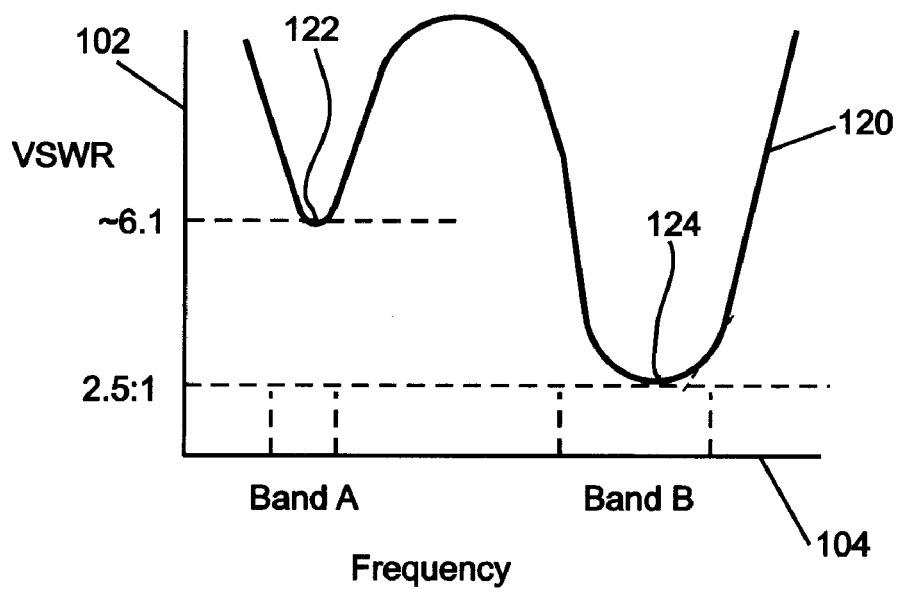

The present invention will now be described more fully with reference to the accompanying drawings, in which specific embodiments of the invention are shown. The invention may, however, be embodied in many different forms and should not be construed to limited to the specific embodiments herein. In some of the drawings, the thickness of various structures may be exaggerated for illustration, or not shown at all in cases where the clarity of other aspects of the drawing is important to understanding an embodiment. Also, like numbers refer to like elements throughout the description of the drawings. In some of the embodiments, a type of internal antenna is discussed which is often referred to as a "planar" inverted-F antenna. It should be noted that at least in some cases, such antennas are not strictly planar or may not look like the letter F. Often such an antenna is deformed, bent, or otherwise distorted to conform to the housing in which it is enclosed. Notwithstanding the above, such an antenna may still be referred to as a planar antenna, an inverted-F antenna, or the like.

It should be pointed out that references may be made in this disclosure to figures and descriptions using terms such as "up," "top," "down," "inner," outer, and the like. These terms are used merely for convenience and refer only to relative positioning of features as shown from the perspective of the reader of this disclosure. Such terms are not meant to imply any limitation on the orientation or positioning of various elements in an actual physical embodiment of the invention.

It may be helpful to the reader if some of the terminology used in this description is understood from the beginning. Other terms are defined when first used or should be assumed to have their customary meaning in the art. The term "interface" and similar terms, for example, as might be used with the term "RF interface" is meant in its broadest, generic sense. The interface may simply be electrical connections between two different portions or stages of a mobile terminal or antenna system. Alternatively, the interface may encompass various components and circuits which cause two systems to communicate with each other to carry out an intended function. The interface can include RF signal and/or ground contacts. The term "switchable matching arrangement" is intended to encompass any and all alternatives for connection of an antenna element or antenna elements into the internal systems of a mobile terminal or device. A switchable matching arrangement may include a switch which simply changes the feed points or connections to an antenna element. Alternatively, a switchable matching arrangement may include a matching network or multiple matching networks. A switch used in a switchable matching arrangement does not need to be a single physical switch. Switching may be accomplished via software, programmable microprocessors or similar devices, a plurality of switches, a mechanical relay or relays, one or more solid state relays or other semiconductor devices, or any other known switching technology.

Some embodiments of the present invention are described with reference to a "matching network" or with similar terminology making use of the term "matching." Such terminology is intended to encompass any matching circuitry or components regardless of the complexity of the design. For example, the most common matching network consists of capacitors and inductors, one being disposed in series between the RF interface and an antenna, and the other being disposed in parallel. Such a matching network can have a plurality of stages, each comprising a capacitor and an inductor, or combinations of the two. With such a matching network, the values of the components are adjusted to achieve a matching condition given the particular configuration of radiating elements or the type of radiating element used with the antenna. Such matching networks or circuits are well-known in the art and will not be described in detail. However, the term "matching network" is intended to encompass more complex circuits, including active types, which may rely on digital signal processing, or similar techniques.

The terms "antenna system," and "antenna" as well as "antenna element" or "radiating element" are generally used as follows. The antenna system is used in its broadest sense and can include switching, matching, connections, antenna elements, and other interface elements. Matching networks can be applied to the RF signal and/or ground contacts. An antenna can generally be considered the physical radiating element or elements and connections and supports needed to mount them and feed them. A radiating element as used herein can be interpreted as encompassing the physical, often metallic, parts that radiated and pick up RF energy. Note the term "radiating" element or like terms is not meant to imply that such an antenna element or antenna system only transmits. As used in the context of this disclosure, a radiating element both transmits and receives signals.

Figure 2A:
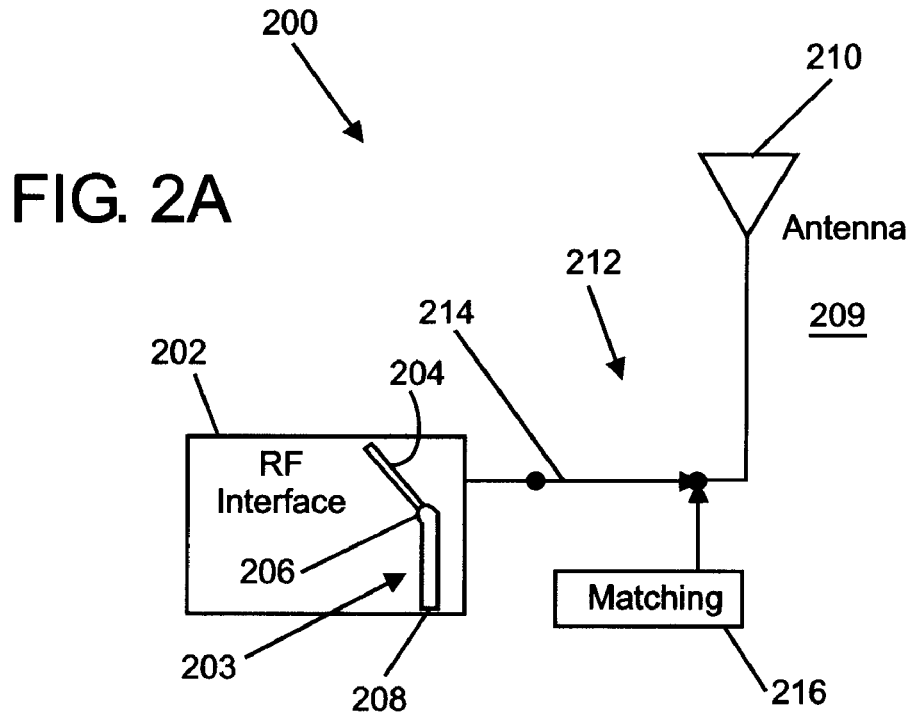
FIG. 2 is a functional block diagram which illustrates both the physical arrangement and method of operation of an antenna system according to one embodiment of the invention.
Figure 2B:
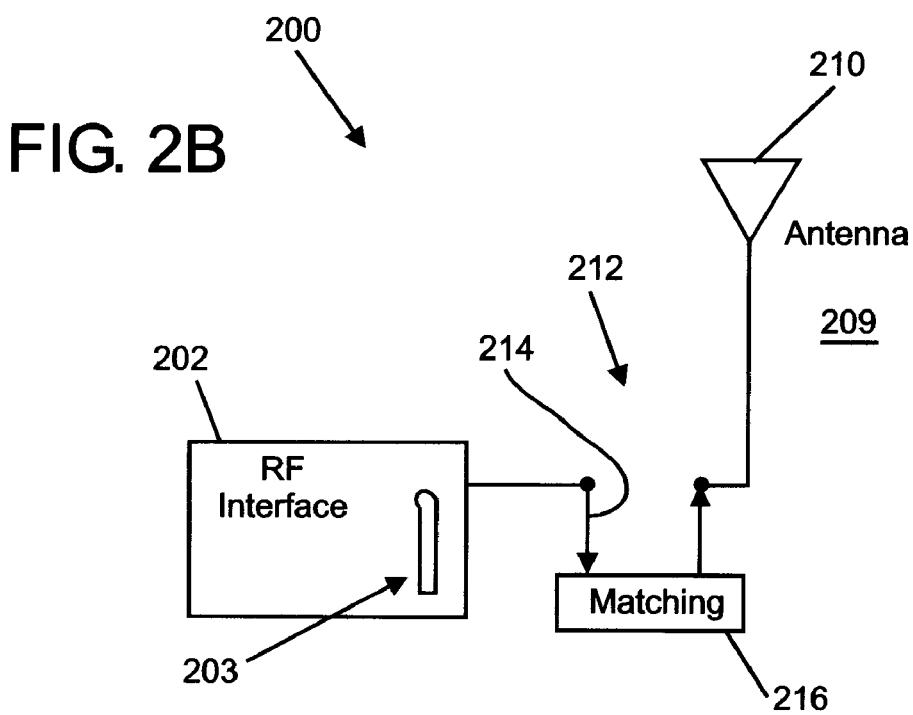

FIG. 2 is a schematic illustration showing the physical characteristics and method of operation of one example embodiment of the invention. FIG. 2A illustrates the operation with the flip cover of the mobile terminal in a first position, and FIG. 2B illustrates operation with the flip cover of the mobile terminal in a second position. In this example, the first position corresponds to the mobile terminal being open, and the second position corresponds to the mobile terminal being closed. It will be appreciated that the correspondence between the position of the flip cover, and a first and second matched condition for the switchable matching arrangement is but an arbitrary example only. Also, it should be noted that the particular type of mobile terminal illustrated in FIG. 2 and in some of the other figures is a mobile terminal of the "clam-shell" type. Such a mobile terminal typically includes an active flip cover which covers the ear when a person is using the terminal like a conventional telephone. Again, this is an example only and the invention can be adapted to other types of terminals with other types and configurations of flip covers.

Antenna system 200 shown in FIG. 2 includes an RF interface, 202. A schematic illustration of a mobile terminal of the cellular telephone type, 203, is shown within the RF interface. This illustration is meant to serve as an icon. If the mobile phone is illustrated in an open position, the RF interface is feeding the antenna with the mobile terminal in an open position. Likewise, if the mobile terminal is illustrated in the closed position, the RF interface, 202, is feeding the antenna with the mobile terminal in a closed position. The particular mobile terminal illustrated in FIG. 2 includes flip cover 204, hinge 206, and case 208. The mobile terminal will not be described in further detail for the remainder of discussion of FIGS. 2, 3, 4, and 5.

Antenna system 200 of FIG. 2 includes antenna 209 with radiating element 210 and switchable matching arrangement 212, disposed between RF interface 202 and radiating element 210. Switchable matching arrangement 212 includes switch 214 and matching network 216. The antenna system including radiating element 210 is designed to be matched to the telephone transceiver through RF interface 202 without matching network 216 when mobile terminal 203 is in an open position. As can be seen, in this case, switch 214 feeds the antenna system directly. In a typical embodiment, a processing platform within the mobile terminal determines the position of flip cover 204. Switch 212 then switches the antenna system into a first matching condition if the flip cover is open. In the example of FIG. 2A, this first matching condition is that of being connected without matching network 216. In the example of FIG. 2B, a determination is made that the flip cover for mobile terminal 203 is in the closed position. Matching network 216 is designed to provide a better match for antenna 209 with the flip cover closed. Thus, in FIG. 2B, switch 214 has changed positions so that matching network 216 is now disposed in series with the antenna. Thus, FIG. 2B illustrates a second matching condition, more appropriate for the closed configuration of the mobile terminal. With an arrangement like that of FIG. 2, good performance is achieved with radiating element 210 regardless of the open or closed position of the flip cover.

Figure 3A:
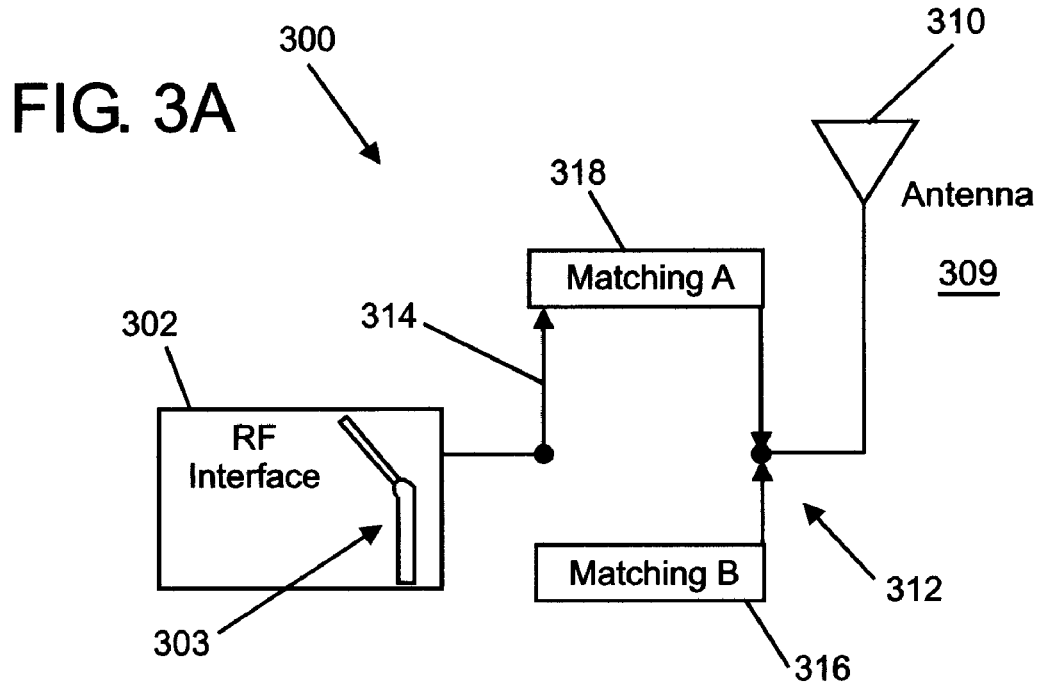
FIG. 3 is a functional block diagram which illustrates both the physical arrangement and method of operation of an antenna system according to another embodiment of the invention.
Figure 3B:
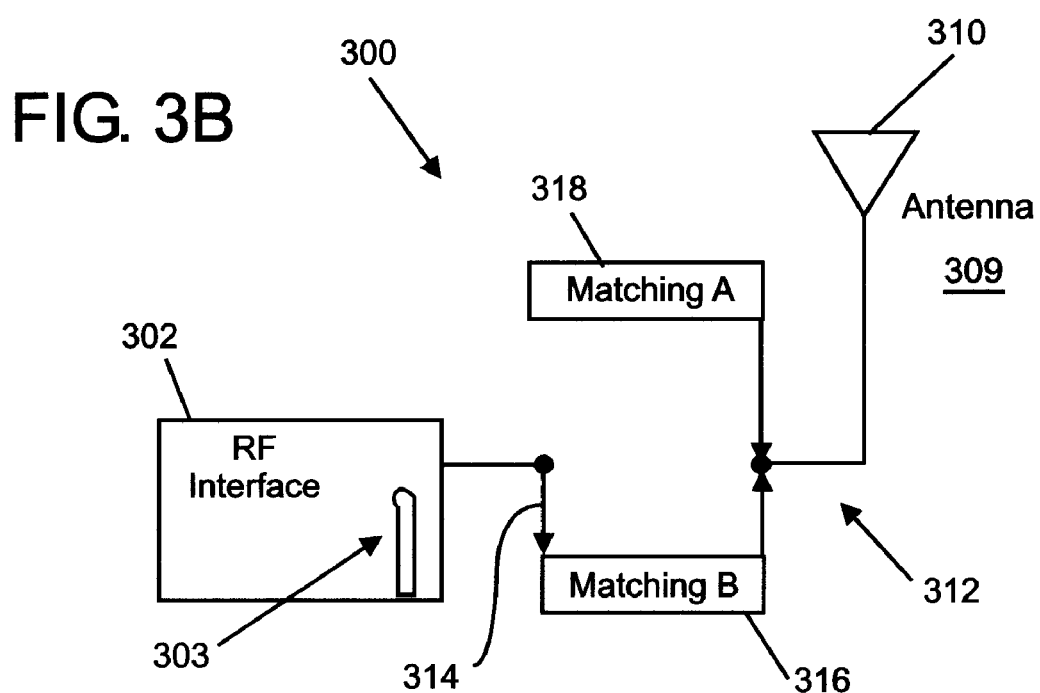

FIG. 3 illustrates another example embodiment of the invention. FIG. 3 is similar to FIG. 2, and some details will not be described further. FIG. 3 is again divided into FIGS. 3A and 3B to illustrate how a mobile terminal operates with the flip cover in two different positions and in a first and second matched condition corresponding to the two positions. Again, RF interface 302 is connected ultimately to radiating element 310 of antenna 309. In FIG. 3A, mobile terminal 303 is in an open position. In such a situation, switching arrangement 312 of antenna system 300 connects matching network A, 318, to the antenna via switch 314. Turning to FIG. 3B, when mobile terminal 303 has its flip cover closed, a processing platform within the mobile phone causes switch 314 to connect matching Network B, 316 to antenna 309. Thus, in the embodiment of FIG. 3, the antenna performance can be optimized for both an open and closed configuration.

Figure 4A:
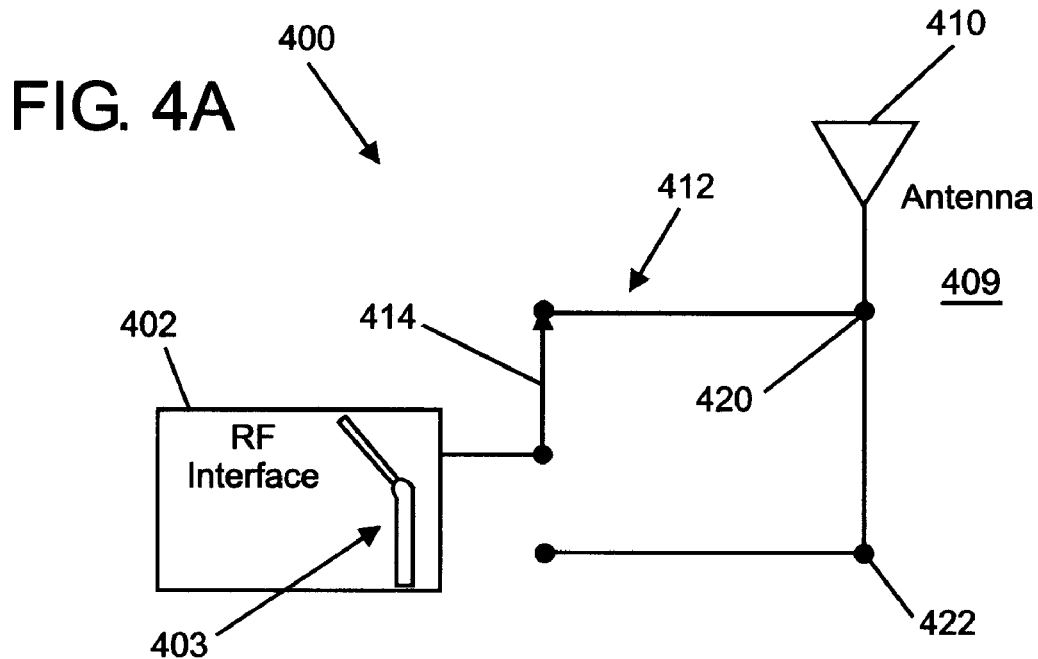
FIG. 4 is another functional block diagram which illustrates method and physical arrangement according to yet another embodiment of the invention. Again.
Figure 4B:
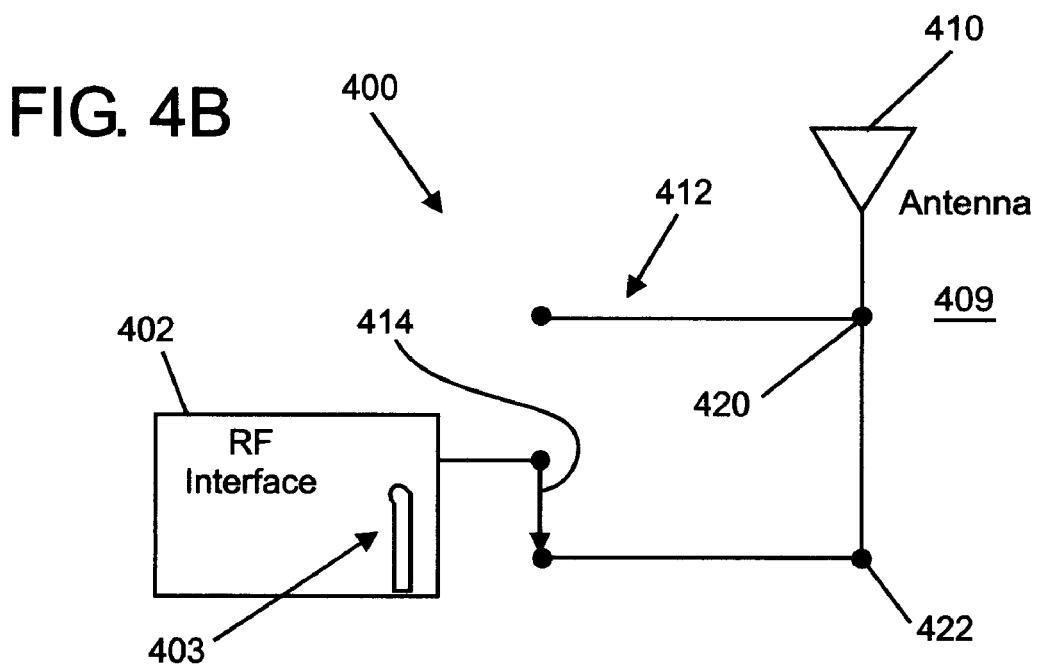

FIG. 4 illustrates still another example embodiment of the invention. Again, antenna system 400 is illustrated in FIG. 4A with mobile terminal 403, open, and a matching arrangement producing a first matched condition, and in 4B with mobile terminal 403 closed, and a matching arrangement 402 producing a second matched condition. RF interface and switch 414 are pictured as before. Antenna 409 includes radiating element 410 in a similar manner as in the previous embodiments. However, in this example, switchable matching arrangement 412 does not select a matching network. Instead, switchable matching arrangement 412 feeds radiating element 410 at either feed point 420 or feed point 422 depending on whether the mobile terminal is open of closed. Thus, in this example, antenna 409 can include radiating element 410 with multiple feed points. In FIG. 4A, antenna system 400 achieves a first matched condition with antenna element 410 fed at a first feed point 420, and it achieves a second matched condition in FIG. 4B, with antenna element 410 fed at a second feed point, 422. As before, the correspondence between the position of the feed points of the antenna element and the open and closed positions of a flip cover for a mobile terminal are but an example only.

Figure 5A:
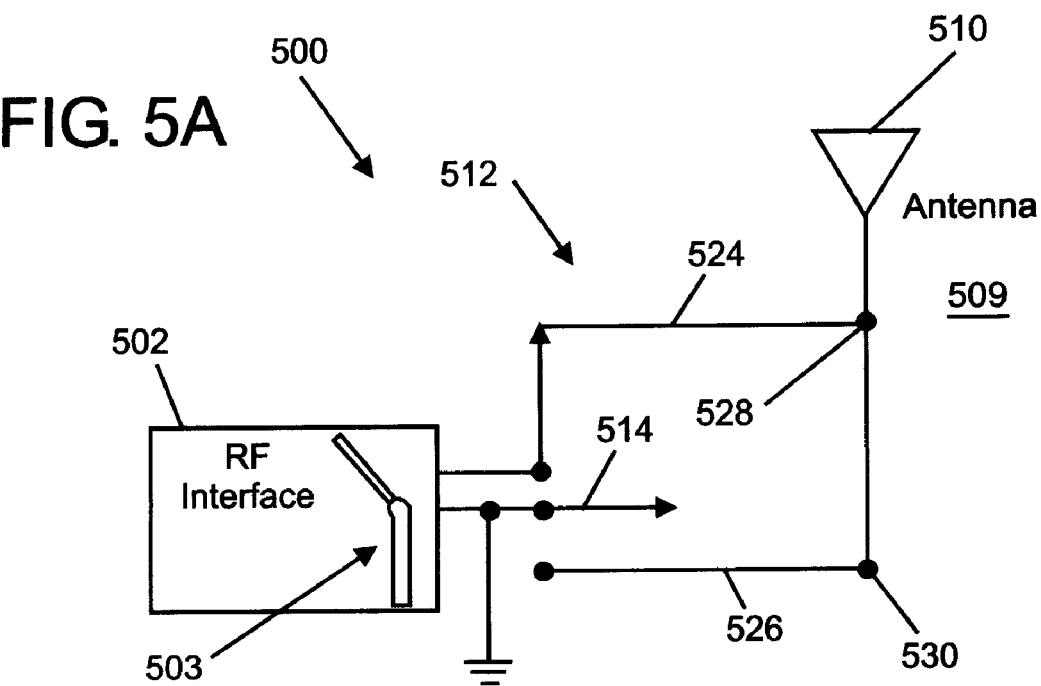
FIG. 5 is another functional block diagram that illustrates the physical layout and method of operation of an antenna system according to another embodiment of the invention.
Figure 5B:
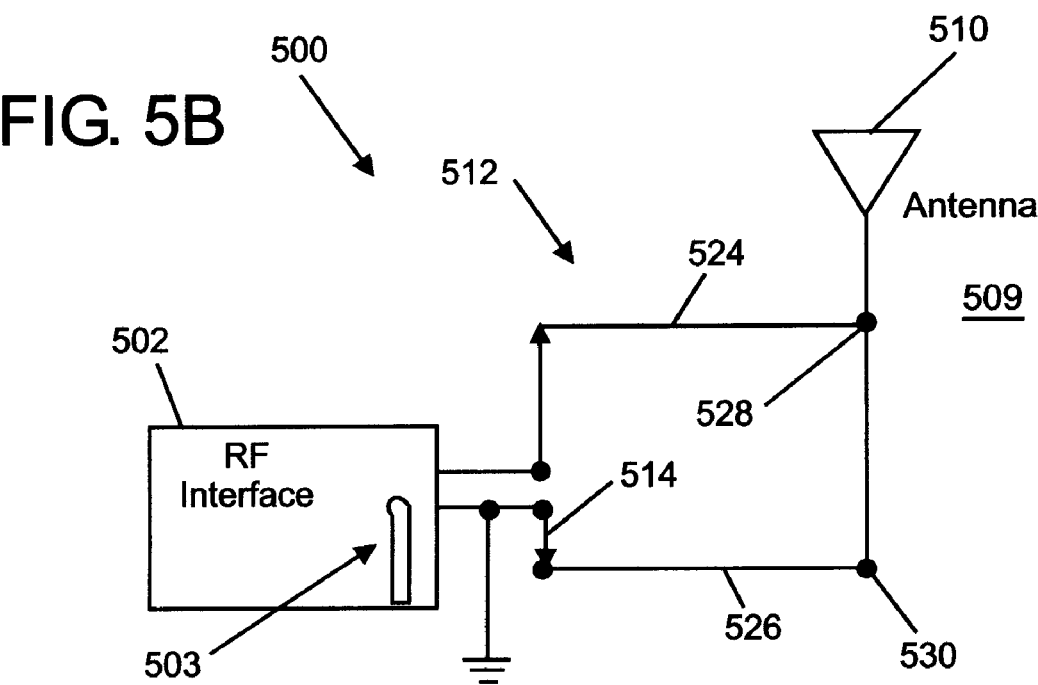

FIG. 5 illustrates another example embodiment of the invention. In the case of FIG. 5, switchable matching arrangement 512 again includes switching without a matching network. It should be noted, however, that in the case of FIG. 5, and in the case of any of the other embodiments, a matching network can be combined with passive, selectable connections to achieve the function of the invention. In the case of FIG. 5, antenna system 500 includes RF interface 502, which transmits signals from transceiver components of mobile terminal 503 with the flip cover in either the open position as shown in FIG. 5A or the closed position as shown in FIG. 5B. Antenna 509 includes radiating element 510 as before. In the example of FIG. 5, however, the particular type of antenna includes both an RF signal feed, 524, and a ground feed, 526. For example, such an antenna can be a planar, inverted-F antenna, or other type of inverted planar antenna as previously discussed. In such a case, antenna 509 can include a switchable ground connection, 530, which is connected or disconnected by switch 514. Thus, the first matched condition as shown in FIG. 5A includes the switchable ground connection being disconnected. The second matching condition as shown in FIG. 5B, includes the switchable ground connection being made by switch 514 to ground feed 526. In some embodiments, the effect of the arrangement of FIG. 5 can be to produce the planar inverted-F antenna response when ground is connected, and a bent monopole response when the ground is disconnected, as shown in FIG. 5A. The response of antenna 509 in FIG. 5A is that of a monopole with contact point 528. With switchable ground connection 530 disconnected at switch 514, depending on the specific design, the ground portion of the antenna may have little effect on performance.

Figure 6:
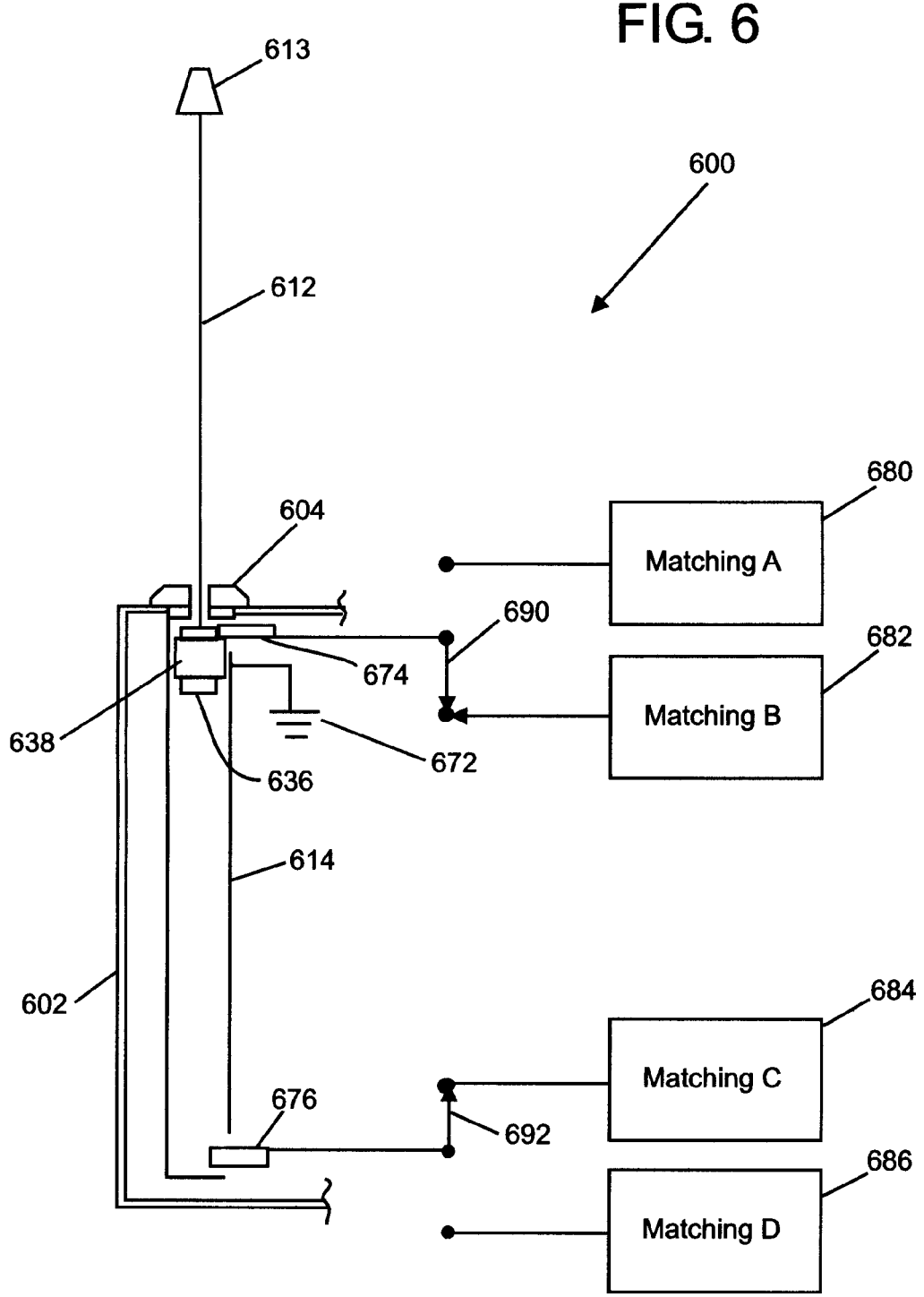
FIG. 6 is a schematic illustration which shows how an antenna system according to embodiments of the invention can be applied to a mobile phone terminal with a collapsible antenna element.

The remainder of the figures illustrate some example physical detail of embodiments of the present invention. FIG. 6 illustrates an embodiment which uses a retractable antenna element, that is, one which can be either extended or collapsed into the body of a mobile terminal such as a cellular telephone. This type of antenna radiating element is common in mobile phones that implement the well-known, code division multiplexed access (CDMA) standards. FIG. 6 presents mobile terminal 600 in a simplified, partially see-through or cut-away view. Most of the internal components are omitted for clarity. Such a mobile terminal includes an antenna assembly, which can either be collapsed or extended but which is connected through an RF interface to transceiver components within the mobile terminal regardless of its position. Some details of how this is achieved are now presented, with the understanding that other details are as is known in the art. Mobile terminal 600 includes an outer case, 602, with an opening for the antenna element. The opening is surrounded by a decorative grommet, 604. Antenna element 612 is a "whip" antenna with a protective cap or secondary helical radiator, 613. The retractable antenna assembly includes the radiating element, 612, a conductive tube, 614, an upper contact assembly, 674, and a lower contact assembly, 676. Conductive tube 614 is maintained at ground potential with respect to the transceiver components, through a ground strap or conductor, 672, in a conventional manner.

In FIG. 6, antenna element 612 is shown in an extended position. Antenna element 614 is operatively connected to a contact and guide assembly which includes a conductive sleeve, 636, which is mounted at the end of the antenna element. Insulating sleeve 638 is mounted about and covers a central portion of conductive sleeve 636. As a result, one portion of the conductive sleeve forms an upper contact surface and another portion of the conductive sleeve forms a lower contact surface at opposed ends of conductive sleeve 636. Conductive tube 614 of FIG. 6 includes an elongated tubular body having a closed end at the bottom of the mobile terminal, and an open end at the top of the mobile terminal. The outside diameter of the insulating sleeve can be selected to allow the antenna assembly to freely slide within conductive tube 614. As can be appreciated from the drawing, upper contact assembly 674 contacts the upper contact surface of conductive sleeve 636 when antenna element 612 is in the extended position. Likewise, when the antenna is collapsed, the lower portion of conductive sleeve 636 is in electrical contact with contact assembly 676. Thus, the antenna element of the antenna system in FIG. 6 is connected to an RF interface and subsequently to other transceiver components regardless of whether the antenna element is in the extended or collapsed condition. Thus, mobile terminal 600 can provide optimized telecommunication signaling with the antenna in either position. However, the matching characteristics of the antenna element will change depending on whether the antenna assembly is extended or collapsed.

Those of skill in the art will appreciate that various embodiments of the invention can be applied to a mobile terminal with an antenna system like that discussed above. For example, conducting tube 614 can be treated as a portion of the radiating element, and various feed points can be applied not only depending on whether the antenna assembly is collapsed or extended, but also depending on whether a movable cover is open or closed. Additionally, a matching network or two matching networks can be switched prior to any additional matching that occurs to account for the fact that the antenna element can be in different positions. As in the particular example shown in FIG. 6, four matching networks can be provided. First matching network 680 is labeled A, second matching network 682 is labeled B, third matching network 684 is labeled C, and fourth matching network 686 is labeled D. The four matching networks together with switches 690 and 692 form a switchable matching arrangement according to an example embodiment of the invention. Switch 690 is operable to switch either matching network 680 or matching network 682 in series with the extended antenna element depending on whether the movable cover is in the open or closed position. Switch 692 is operable to switch either matching network 684 or matching network 686 into the antenna system when the antenna element is collapsed, and in accordance with whether a movable cover is in the closed or open position. Thus, a collapsible antenna system as shown in FIG. 6 can be appropriately matched for whether a movable cover is open or closed in addition to being matched for whether the antenna assembly is extended or collapsed.

FIG. 7 illustrates an embodiment similar to FIG. 6, except instead of using multiple matching networks to extend the matching to different positions of a retractable antenna, it uses multiple matching networks to provide separate matching for both transmit (TX) and receive (RX) modes. A matching network is provided for both the open and closed condition in each mode. FIG. 7 presents a matching portion 700 of a mobile terminal. Although not shown, the antenna element of the antenna system in FIG. 7 is connected to switch 779. Switch 779 can switch between the feeds to the various matching arrangements as shown depending on the mode of the mobile terminal being transmit or receive as indicated by the "TX" and "RX" legends. Thus, the mobile terminal can provide optimized telecommunication signaling in both the TX and RX modes.

Those of skill in the art will appreciate that various embodiments of the invention can be applied to a mobile terminal with an antenna system like that discussed above. For example, a matching network or two matching networks can be switched prior to any additional matching that occurs to account for the fact that the terminal is in transmit or receive mode. As in the particular example shown in FIG. 7, four matching networks can be provided. First matching network 780 is labeled A, second matching network 782 is labeled B, third matching network 784 is labeled C, and fourth matching network 786 is labeled D. The four matching networks together with switches 779, 790 and 792 form a switchable matching arrangement according to an example embodiment of the invention. Switch 790 is operable to switch either matching network 780 or matching network 782 in series with the antenna element when the terminal is in the transmit mode depending on whether the movable cover is in the open or closed position. Switch 792 is operable to switch either matching network 784 or matching network 786 into the antenna system when the terminal is in the receive mode, and in accordance with whether a movable cover is in the closed or open position. Thus, an antenna system can be appropriately matched for whether a movable cover is open or closed in addition to being matched for whether the mobile terminal is in the transmit or receive mode.

FIG. 8 illustrates an embodiment similar to FIG. 6 and FIG. 7, except instead of using multiple matching networks to extend the matching to different positions of a retractable antenna, it uses multiple matching networks to provide separate matching for both a low frequency band and a high frequency band. A matching network is provided for both the open and closed condition and each band. FIG. 8 presents a matching portion 800 of a mobile terminal. Although not shown, the antenna element of the antenna system in FIG. 8 is connected to switch 879. Switch 879 can switch between the feeds to the various matching arrangements as shown depending on the operating band of the mobile terminal being the high band or the low band as indicated by the drawing legends. Thus, the mobile terminal can provide optimized telecommunication signaling for both bands.

Those of skill in the art will appreciate that various embodiments of the invention can be applied to a mobile terminal with an antenna system like that discussed above. For example, a matching network or two matching networks can be switched prior to any additional matching that occurs to account for the fact that the terminal is operating on a particular band. As in the particular example shown in FIG. 8, four matching networks can be provided. First matching network 880 is labeled A, second matching network 882 is labeled B, third matching network 884 is labeled C, and fourth matching network 886 is labeled D. The four matching networks together with switches 879, 890 and 892 form a switchable matching arrangement according to an example embodiment of the invention. Switch 890 is operable to switch either matching network 880 or matching network 882 in series with the antenna element when the terminal is operating in the low band depending on whether the movable cover is in the open or closed position. Switch 892 is operable to switch either matching network 884 or matching network 886 into the antenna system when the terminal is operating in the high band, and in accordance with whether a movable cover is in the closed or open position. Thus, an antenna system can be appropriately matched for whether a movable cover is open or closed in addition to being matched for whether the mobile terminal is operating in a low frequency band or a high frequency band. Of course, additional switches and matching networks can be added to accommodate terminals, which operate on additional frequency bands. Such an arrangement can also be adapted to mobile terminals that have only one antenna and provide Global Positioning System (GPS) function, or provide Bluetooth short range wireless functionality in addition to mobile phone signaling.

Figure 9:
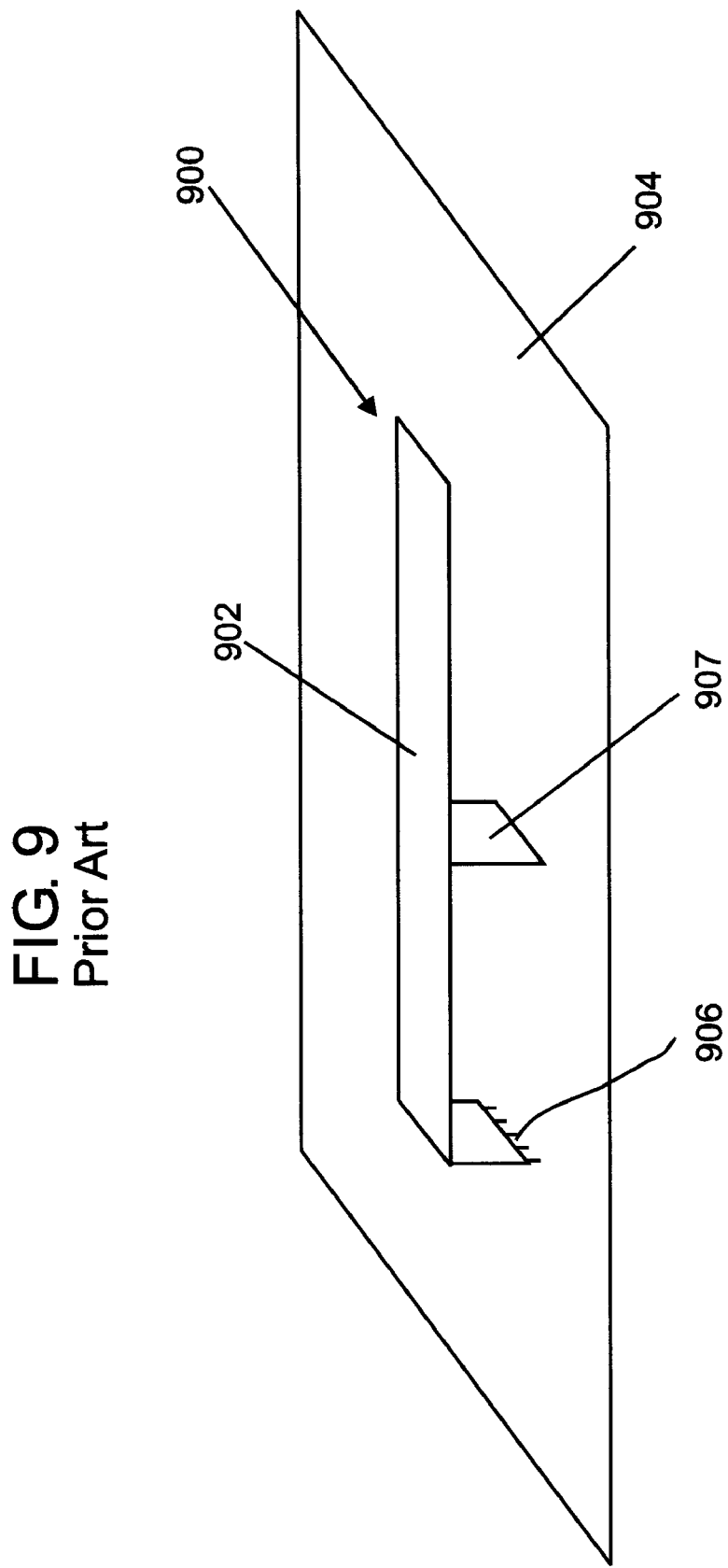
FIG. 9 is a schematic illustration of a planar, inverted, "F" antenna, shown in order to provide background information useful in understanding the embodiment of the invention that is discussed relative to FIG. 10.
Figure 10:
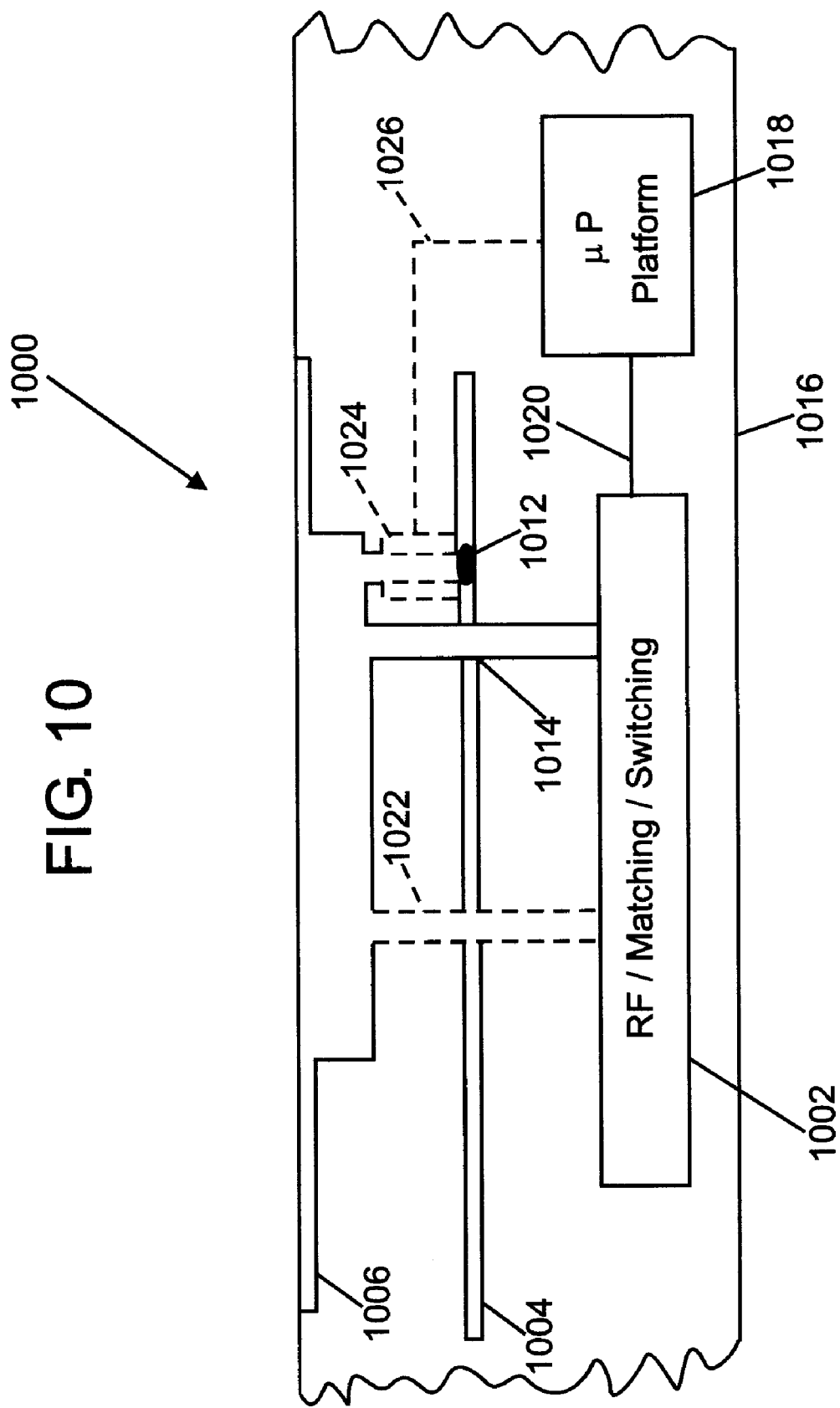
FIG. 10 is a cut-away view of a mobile terminal according to example embodiments of the invention employing a planar antenna.

FIG. 10 illustrates an example implementation of the invention in a device that uses a built-in, planar antenna. In order to more fully comprehend the description of that embodiment, such antennas will now be described generally with respect to FIG. 9. One such type of antenna is the planar, inverted F antenna (PIFA) such as the one illustrated. In FIG. 9, antenna 900 includes linear radiating element 902 maintained in a spaced apart relationship with ground plane 904. Conventional inverted-F antennas, such as that illustrated in FIG. 9, derive their name from their resemblance to the letter "F" laying on its face. In FIG. 9, radiating element 902 is connected to the ground plane 904 as indicated at 906. A signal feed connection, 907, extends from underlying transceiver (not shown) circuitry through ground plane 904 to radiating element 902. An antenna like that illustrated in FIG. 9 can be deformed and bent to fit the case of a device which is making use of such an antenna.

FIG. 10 is a schematic illustration of a radio telephone type mobile terminal, which can be of the cellular or PCS type, and which makes use of a planar antenna system according to embodiments of the invention. FIG. 10 illustrates a close-up view in which the housing of the mobile terminal is presented with a "see-through" side. In FIG. 10, mobile terminal 1000 includes electronic transceiver components 1002, shown schematically, which are assembled in the traditional fashion. These transceiver components can include RF stages, an RF interface, the switchable matching arrangement, together with any other switching required to cause the radio terminal to function in the normal fashion while making use of an embodiment of the invention. Ground plane 1004 serves as the ground plane for the planar, inverted F antenna, 1006. A ground feed conductor is connected to the ground plane at point 1012. The antenna radiating element is substantially parallel to the ground plane, subject to distortions and curvatures as might be present for the particular application, as is known in the art. A signal feed conductor passes through an aperture in the ground plane at point 1014 and is connected to transceiver components 1002. The transceiver components, the ground plane, and the antenna system are enclosed in housing 1016. Processing platform 1018 includes a microprocessor (uP) and necessary supporting components and systems, such as memory.

As previously discussed, processing platform 1018 can be operable to control the transceiver components, and in fact the operation of the entire mobile terminal, and to determine when a movable cover is in, at least, a first position or a second position. A configuration like that shown in FIG. 10 can be used to implement various embodiments of the invention. For example, if a matching network is to be switched in or out of the feed path for the radiating element of the antenna, processing platform 1018 can control this switching via connection 1020. The same connection can be used to alter the signal feed points of the antenna. If an additional feed point is needed for such an implementation, another RF signal feed can optionally be provided as shown at 1022. In the case where a ground conductor is connected and disconnected to alter the matching conditions between a planar antenna and a bent monopole antenna, switch 1024 makes and breaks the ground connection via control line 1026. Thus, a switchable matching arrangement according to embodiments of the invention can be provided entirely within transceiver components 1002, or can include a switch for the ground connection such as switching element 1024, or can include other switching arrangements not shown. Such switching arrangements can consist of or include, for example, microelectronic mechanical switches (MEMS), field effect transistors (FET's) and/or PIN diodes. It should be noted that although example embodiments have been disclosed herein the context of a cellular or radio telephone type mobile terminal, such terms are synonymous with and may include: a cellular telephone with or without a multi-line display; a personal communication system (PCS) terminal; a radiotelephone combined with data processing, facsimile, and data communication capabilities; a personal data assistant (PDA) that can include a radiotelephone, pager, Internet access, web browser, or organizer; and a conventional laptop or palmtop computer or other appliance that includes a wireless transceiver. The term "mobile terminal" is also intended to encompass so called "pervasive computing devices" that include radio communication capabilities.

Specific embodiments of an invention are described herein. One of ordinary skill in the telecommunication and antenna arts will quickly recognize that the invention has other applications in other environments. Many environments are possible, and the following claims are not intended to limit the scope of the invention to the specific embodiments described above.

What is claimed is:

1. A mobile terminal comprising:
   a movable cover;
   transceiver components operable to transmit and receive communication signals;
   a processing platform operable to control the transceiver components and to determine when the movable cover is in a first position and a second position; and
   an antenna system connected to the transceiver components, the antenna system further comprising a radiating element and a switch which is responsive to the processing platform to connect the transceiver components to the radiating element at a first feed point to achieve one of a first matched condition and a second matched condition when the movable cover is in the first position, and at a second feed point to achieve the other of the first matched condition and the second matched condition when the movable cover is in the second position.

2. The mobile terminal of claim 1 wherein the radiating element can be extended and collapsed, and wherein:
   the first matched condition and the second matched condition are achieved when the radiating element is one of extended and collapsed; and
   the switch is further operable to switch the antenna system into a third matched condition when the movable cover is in the first position and the radiating element is another of extended and collapsed, and into a fourth matched condition when the movable cover is in the second position and the radiating element is the other of extended and collapsed.

3. The mobile terminal of claim 1 wherein:
   the first matched condition and the second matched condition are achieved when the mobile terminal is in one of a transmit mode and a receive mode; and
   the switch is further operable to switch the antenna system into a third matched condition when the movable cover is in the first position and the mobile terminal is in the other of the transmit mode and the receive mode, and into a fourth matched condition when the movable cover is in the second position and the mobile terminal is in the other of the transmit mode and the receive mode.

4. The mobile terminal of claim 1 wherein:
   the first matched condition and the second matched condition are achieved when the mobile terminal is operating in one frequency band; and
   the switch is further operable to switch the antenna system into a third matched condition when the movable cover is in the first position and the mobile terminal is operating in another frequency band, and into a fourth matched condition when the movable cover is in the second position and the mobile terminal is operating in the other frequency band.

5. A method of operating a mobile terminal having a movable cover, the method comprising:
   determining a position of the movable cover, wherein the movable cover is movable between at least a first position and a second position;
   switching a radiating element of an antenna system comprising a radiating to a first feed point to achieve a first matching condition for the antenna system when the movable cover is in the first position;
   switching the radiating element of the antenna system to a second feed point to achieve a second matching condition when the movable cover is in the second position; and
   engaging in telecommunication signaling through the antenna system.

6. The method of claim 5 wherein the achievement of the first matching condition and the second matching condition are accomplished when the radiating element is in one of an extended state and a collapsed state, and further comprising:
   switching the antenna system into a third matching condition when the movable cover is in the first position and the radiating element is in another of the extended state and the collapsed state; and
   switching the antenna system into a fourth matching condition when the movable cover is in the second position and the radiating element is in the other of the extended state and the collapsed state.

7. The method of claim 5 wherein the achievement of the first matching condition and the second matching condition are accomplished when the mobile terminal is operating in one of a transmit mode and a receive mode, and further comprising:
   switching the antenna system into a third matching condition when the movable cover is in the first position and the mobile terminal is operating in the other of the transmit mode and the receive mode; and
   switching the antenna system into a fourth matching condition when the movable cover is in the second position and the mobile terminal is operating in the other of the transmit mode and the receive mode.

8. The method of claim 5 wherein the achievement of the first matching condition and the second matching condition are accomplished when the mobile terminal is operating one frequency band, and further comprising:
   switching the antenna system into a third matching condition when the movable cover is in the first position and the mobile terminal is operating in another frequency band; and
   switching the antenna system into a fourth matching condition when the movable cover is in the second position and the mobile terminal is operating in the other frequency band.

9. A mobile terminal comprising:
   a movable cover movable between at least a first position and a second position;
   an antenna system comprising a radiating element;
   means for determining a position of the movable cover;
   means for switching the radiating element to a first feed point to achieve a first matching condition for the antenna system when the movable cover is in the first position;
   means for switching the radiating element to a second feed point to achieve a second matching condition for the antenna system when the movable cover is in the second position; and
   means for engaging in telecommunication signaling through the antenna system.

10. The mobile terminal of claim 9 further comprising:
means for determining when the radiating element is in an extended state and a collapsed state;
means for switching the antenna system into the first matching condition and the second matching condition when the radiating element is in one of the extended state and the collapsed state;
means for switching the antenna system into a third matching condition when the movable cover is in the first position and the radiating element is in another of the extended state and the collapsed state; and
means for switching the antenna system into a fourth matching condition when the movable cover is in the second position and the radiating element is in the other of the extended state and the collapsed state.

11. The mobile terminal of claim 9 further comprising:
means for switching the antenna system into the first matching condition and the second matching condition when the mobile terminal is in one of a transmit mode and a receive mode;
means for switching the antenna system into a third matching condition when the movable cover is in the first position and the mobile terminal is in the other of the transmit mode and the receive mode; and
means for switching the antenna system into a fourth matching condition when the movable cover is in the second position and the mobile terminal is in the other of the transmit mode and the receive mode.

12. The mobile terminal of claim 9 further comprising:
means for switching the antenna system into the first matching condition and the second matching condition when the mobile terminal is operating on one frequency band;
means for switching the antenna system into a third matching condition when the movable cover is in the first position and the mobile terminal is operating on another frequency band; and
means for switching the antenna system into a fourth matching condition when the movable cover is in the second position and the mobile terminal is operating on the other frequency band.

13. A mobile terminal comprising:
a movable cover;
transceiver components operable to transmit and receive communication signals;
a processing platform operable to control the transceiver components and to determine when the movable cover is in a first position and a second position; and
an antenna system connected to the transceiver components, the antenna system further comprising a radiating element and a switch which is responsive to the processing platform to ground the radiating element to achieve a planar, inverted-F response for the antenna system when the movable cover is in the first position, and to disconnect ground from the radiating element to achieve a monopole response for the antenna system when the movable cover is in the second position.

14. The mobile terminal of claim 13 wherein the radiating element can be extended and collapsed, and wherein:
a first matched condition and a second matched condition are achieved based on the inverted-F and monopole responses when the radiating element is one of extended and collapsed; and
the switch is further operable to switch the antenna system into a third matched condition when the movable cover is in the first position and the radiating element is another of extended and collapsed, and into a fourth matched condition when the movable cover is in the second position and the radiating element is the other of extended and collapsed.

15. The mobile terminal of claim 13 wherein:
a first matched condition and a second matched condition are achieved based on the inverted-F and monopole responses when the mobile terminal is in one of a transmit mode and a receive mode; and
the switch is further operable to switch the antenna system into a third matched condition when the movable cover is in the first position and the mobile terminal is in the other of the transmit mode and the receive mode, and into a fourth matched condition when the movable cover is in the second position and the mobile terminal is in the other of the transmit mode and the receive mode.

16. The mobile terminal of claim 13 wherein:
a first matched condition and a second matched condition are achieved based on the inverted-F and monopole responses when the mobile terminal is operating in one frequency band; and
the switch is further operable to switch the antenna system into a third matched condition when the movable cover is in the first position and the mobile terminal is operating in another frequency band, and into a fourth matched condition when the movable cover is in the second position and the mobile terminal is operating in the other frequency band.

17. A method of operating a mobile terminal having a movable cover, the method comprising:
determining a position of the movable cover, wherein the movable cover is movable between at least a first position and a second position;
connecting a ground to a radiating element of an antenna system to produce an inverted-F response for the antenna system when the movable cover is in the first position;
disconnecting the ground from the radiating element of the antenna system to produce an monopole response for the antenna system when the movable cover is in the second position; and
engaging in telecommunication signaling through the antenna system.

18. The method of claim 17 wherein the inverted-F and monopole responses correspond to a first matching condition and a second matching condition when the radiating element is in one of an extended state and a collapsed state, and further comprising:
switching the antenna system into a third matching condition when the movable cover is in the first position and the radiating element is in another of the extended state and the collapsed state; and
switching the antenna system into a fourth matching condition when the movable cover is in the second position and the radiating element is in the other of the extended state and the collapsed state.

19. The method of claim 17 wherein the inverted-F and monopole responses correspond to a first matching condition and a second matching condition when the mobile terminal is operating in one of a transmit mode and a receive mode, and further comprising:
switching the antenna system into a third matching condition when the movable cover is in the first position and the mobile terminal is operating in the other of the transmit mode and the receive mode; and
switching the antenna system into a fourth matching condition when the movable cover is in the second position and the mobile terminal is operating in the other of the transmit mode and the receive mode.

20. The method of claim 17 wherein the inverted-F and monopole responses correspond to a first matching condition and a second matching condition when the mobile terminal is operating one frequency band, and further comprising:

switching the antenna system into a third matching condition when the movable cover is in the first position and the mobile terminal is operating in another frequency band; and switching the antenna system into a fourth matching condition when the movable cover is in the second position and the mobile terminal is operating in the other frequency band.

21. A mobile terminal comprising:

a movable cover movable between at least a first position and a second position;

an antenna system comprising a radiating element;

means for determining a position of the movable cover;

means for connecting a ground to a radiating element of an antenna system to produce an inverted-F response for the antenna system when the movable cover is in the first position;

means for disconnecting the ground from the radiating element of the antenna system to produce an monopole response for the antenna system when the movable cover is in the second position; and means for engaging in telecommunication signaling through the antenna system.

22. The mobile terminal of claim 21 wherein the inverted-F and monopole responses correspond to a first matching condition and a second matching condition when the radiating element is in one of an extended state and a collapsed state, and further comprising:

means for switching the antenna system into a third matching condition when the movable cover is in the first position and the radiating element is in another of the extended state and the collapsed state; and means for switching the antenna system into a fourth matching condition when the movable cover is in the second position and the radiating element is in the other of the extended state and the collapsed state.

23. The mobile terminal of claim 21 wherein the inverted-F and monopole responses correspond to a first matching condition and a second matching condition when the mobile terminal is operating in one of a transmit mode and a receive mode, and further comprising:

means for switching the antenna system into a third matching condition when the movable cover is in the first position and the mobile terminal is operating in the other of the transmit mode and the receive mode; and means for switching the antenna system into a fourth matching condition when the movable cover is in the second position and the mobile terminal is operating in the other of the transmit mode and the receive mode.

24. The mobile terminal of claim 21 wherein the inverted-F and monopole responses correspond to a first matching condition and a second matching condition when the mobile terminal is operating one frequency band, and further comprising: means for switching the antenna system into a third matching condition when the movable cover is in the first position and the mobile terminal is operating in another frequency band; and means for switching the antenna system into a fourth matching condition when the movable cover is in the second position and the mobile terminal is operating in the other frequency band.

* * * * *

UNITED STATES PATENT AND TRADEMARK OFFICE
CERTIFICATE OF CORRECTION

PATENT NO. : 6,995,716 B2 Page 1 of 1
DATED : February 7, 2006
INVENTOR(S) : Huan-Sheng Hwang It is certified that error appears in the above-identified patent and that said Letters Patent is hereby corrected as shown below:

Column 12,
Lines 4 and 5, delete "comprising a radiating".

Signed and Sealed this

Twenty-fifth Day of April, 2006

JON W. DUDAS
*Director of the United States Patent and Trademark Office*